(12) United States Patent
Heidrich

(10) Patent No.: US 7,631,451 B1
(45) Date of Patent: Dec. 15, 2009

(54) CONTOURED ARTWORK

(75) Inventor: Richard T. Heidrich, Ft. Wright, KY (US)

(73) Assignee: Designs Direct LLC, Dayton, KY (US)

( * ) Notice: Subject to any disclaimer, the term of this patent is extended or adjusted under 35 U.S.C. 154(b) by 0 days.

(21) Appl. No.: 12/132,467

(22) Filed: Jun. 3, 2008

(51) Int. Cl.
*B32B 7/14* (2006.01)

(52) U.S. Cl. ............................. 40/798; 40/700; 40/768; 40/790; 40/800

(58) Field of Classification Search ................ 40/798, 40/700, 768, 794, 769
See application file for complete search history.

(56) References Cited

U.S. PATENT DOCUMENTS

| | | | | |
|---|---|---|---|---|
| 2,697,889 A * | 12/1954 | Heim | | 40/706 |
| 2,785,490 A * | 3/1957 | Fabry | | 40/711 |
| 3,787,992 A * | 1/1974 | Leonhardt | | 40/743 |
| 4,030,220 A * | 6/1977 | Kotchen | | 40/700 |
| 4,279,087 A * | 7/1981 | Crawford | | 40/786 |
| 4,583,309 A * | 4/1986 | Kane et al. | | 40/711 |
| 4,709,495 A * | 12/1987 | Buckwalter | | 40/661 |
| 4,998,361 A * | 3/1991 | Gordon | | 40/721 |
| 5,074,067 A * | 12/1991 | Cohart | | 40/769 |
| 5,279,880 A * | 1/1994 | Cohart | | 428/138 |
| 6,519,886 B1* | 2/2003 | Johnson et al. | | 40/790 |
| 6,574,897 B1* | 6/2003 | Timmer | | 40/800 |

* cited by examiner

*Primary Examiner*—Lesley Morris
*Assistant Examiner*—Shin Kim
(74) *Attorney, Agent, or Firm*—Wood, Herron & Evans, LLP

(57) ABSTRACT

A contoured framed artwork comprises a picture frame surrounding a support member. The support member is a three-dimensional support member that has a raised, carved, or contoured portion surrounding a planar portion. A two-dimensional artwork is adhered to the planar portion. The support member includes a coating the provides an appearance of plaster or metal, or the like. A variety of different prints can be adhered to the planar portion of the support member to allow the support member to be used with a variety of different artworks.

10 Claims, 2 Drawing Sheets

CONTOURED ARTWORK

BACKGROUND OF THE INVENTION

Originality and creativity are factors that increase the desirability of artwork. Two-dimensional prints are versatile and, generally, inexpensive. Therefore, they are suitable for mass produced artwork. Although there is an unlimited number of two-dimensional prints, these have become very commonplace.

Frescos and molded artworks are quite interesting. Because they are three-dimensional, these have a more interesting visual appearance. Since these are generally molded, they are relatively expensive relative to prints. When three-dimensional artworks are molded even from plastic, they can be expensive. One mold is required for each item. However, they are less versatile.

SUMMARY OF THE INVENTION

The present invention is premised on the realization that a very creative, versatile piece of art particularly suitable for mass production can be formed by using a support member that includes a continuous planar panel surrounded by a contoured or molded portion, which is, in turn, surrounded by a frame. The molded portion can be painted to appear to be metal, plaster or stone. A print is fixed to the planar portion and this entire structure positioned within a frame.

This provides unlimited variability since an unlimited number of different prints can be attached to the molded portion. Further, the molded portion can be painted in a variety of different fashions to create different looks.

Preferably, the molded portion is simply vacuum-formed plastic.

The objects and advantages of the present invention will be further appreciated in light of the following detailed description and drawings in which:

DETAILED DESCRIPTION

Figure 1:
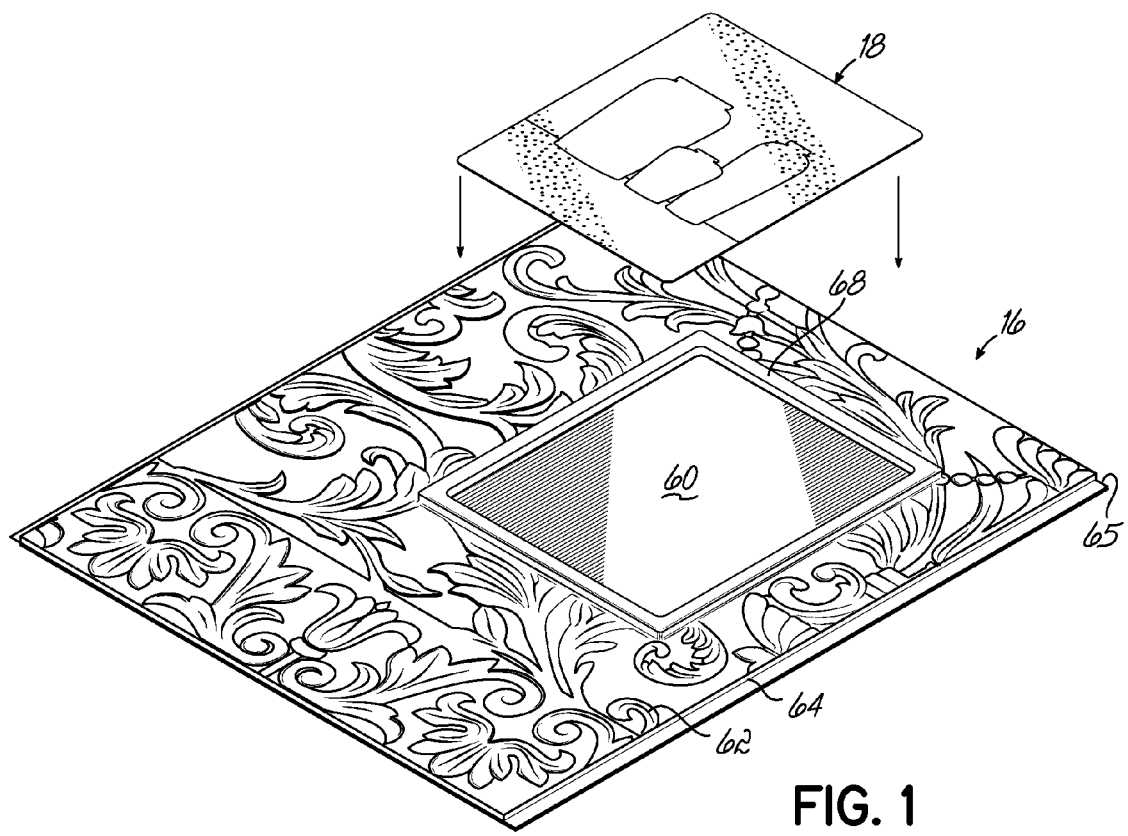
FIG. 1 is an exploded perspective view of the present invention, without a frame or matting.
Figure 2:
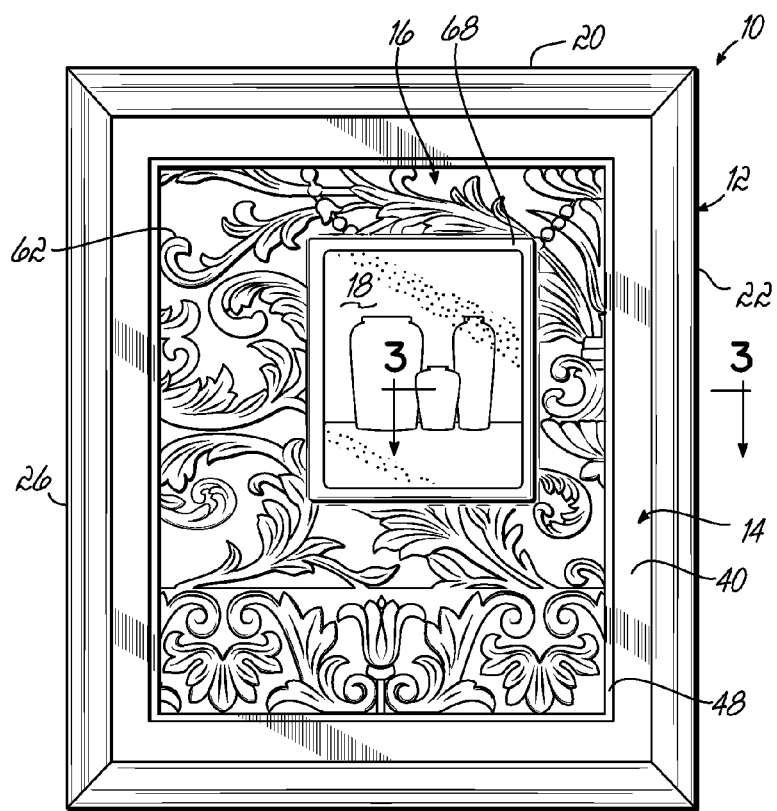
FIG. 2 is a perspective view of the present invention.

As shown in FIG. 1, the present invention is a piece of contoured or molded three-dimensional artwork 10, which includes a picture frame 12, which surrounds matting 14, in turn surrounding a contoured or molded support member 16. Positioned on the support member 16 is a two-dimensional artwork or print 18.

Figure 3:
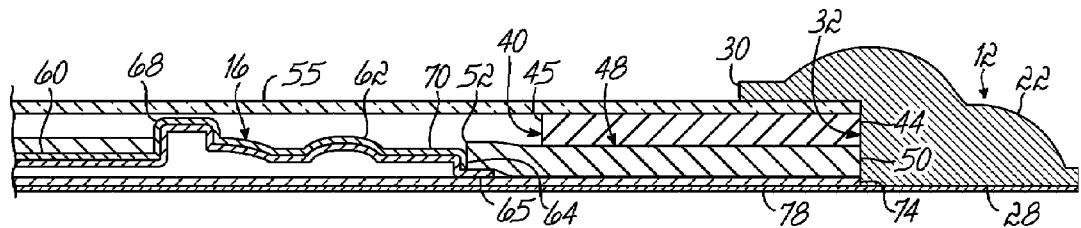
FIG. 3 is a cross sectional view taken at lines 3-3 of FIG. 2.

More particularly, the frame 12 is formed from four interconnected linear frame sections 20, 22, 24, and 26, respectively. The frame 12 includes a backside 28, which lies upon a first plane. Frame 12 includes an inner edge 30 and a rear recessed portion 32, which is adapted to receive the outer edges of matting 14. The matting 14, as shown in FIG. 1 and FIG. 3, is actually two sections of matting. The first section 40 includes outer peripheral edge 44 which is located or positioned in recess 32 of the frame 12. An inner portion 45 extends from the edge 30 of frame 12 inwardly.

Beneath, or inwardly, from the first mat 40, is the second matting section 48. It also includes an outer peripheral edge 50 positioned in the peripheral recess 32, and an inner portion 52, which extends beyond the inner portion 45 of the first matting 40. As shown, there is also an optional glass panel 55 outwardly from the first mat 40.

The contoured support member 16 is located beneath or adjacent the second matting section 48. The support member 16 includes a planar portion 60 which is adapted to receive a two-dimensional print, and a contoured or molded portion 62, which is three-dimensional including depth from the raised portions providing an ornamental design.

The ornamental design can be basically any design an artist wishes to create. The peripheral edge 64 of the support member 16 has a stepped configuration with a peripheral lip 65, which is adapted to fit behind the inner edge of the second matting section 48.

As shown, the planar portion 60 is surrounded by a raised frame portion 68, which provides the appearance of a picture frame surrounding the two-dimensional artwork 18.

The support member can be formed from plaster or metal, but is preferably formed from plastic. Preferably this is vacuum formed polyethylene. The thickness is a matter of choice. But, 3-5 mils polyethylene is sufficient.

Preferably, the support member 16 includes a coating 70. The coating can be a wide variety of different materials. Generally, it will be a paint of some sort. It can be a metallic paint to make the support member appear to be metal. It can be a plaster-like coating material to make the support member appear to be molded plaster. Or, it simply can be a paint. The particular coating is purely a matter of choice to provide the particular appearance desired for the artwork 10.

Behind the support member 16 is a backing member 72, which has a peripheral edge 74, which is also located within the recessed portion 32 of the frame. Further, a paper backing 78 covers the entire back surface of the artwork 10. The backing member can be cardboard or foam core board.

To form the artwork 10 the support member 16 is initially coated with the coating 70 to form the desired appearance. A print 18 is then adhered to the planar portion 60 of support member 16. This is positioned within the two sections of matting 40 and 48, which are then covered with a glass pane 55. This is all fitted within the recessed portion 32 of the frame 12 and a card stock or foam core board backing 72 is positioned behind these, again with a peripheral edge located in the recessed portion 32 of frame 12.

These can be held in position with adhesive or a plurality of fasteners (not shown) fitted within the back portion of the frame 12. This is then covered with a paper backing 78, which is simply stapled to the frame 12.

The structure shown in the figures shows a support member 16, which has a rectangular planar portion 60. This obviously can be changed to any shape, such as square, round or oval, to provide a planar surface that corresponds in size to the outer peripheral edge of the print 18. The raised frame portion 68 of the support member 16 is optional, but does enhance the appearance of the particular structure.

As shown, the support member 16 has a depth that is approximately equal to the thickness of the two matting sections 40,48 so that the support member 16 can fit within the matting members 40,48 and permit glass 55 to rest on the matting sections and not engage the support member.

This design basically allows for endless numbers of variations because the number of different prints are limitless. The particular shape of the support member 16 can take a variety of different shapes, and the raised portion in the support member 16 surrounding the frame portion 68 can assume an endless number of different configurations. Even the location of the planar portion 60, centered or offset relative to the center of the support member, can be varied.

Figure 4:
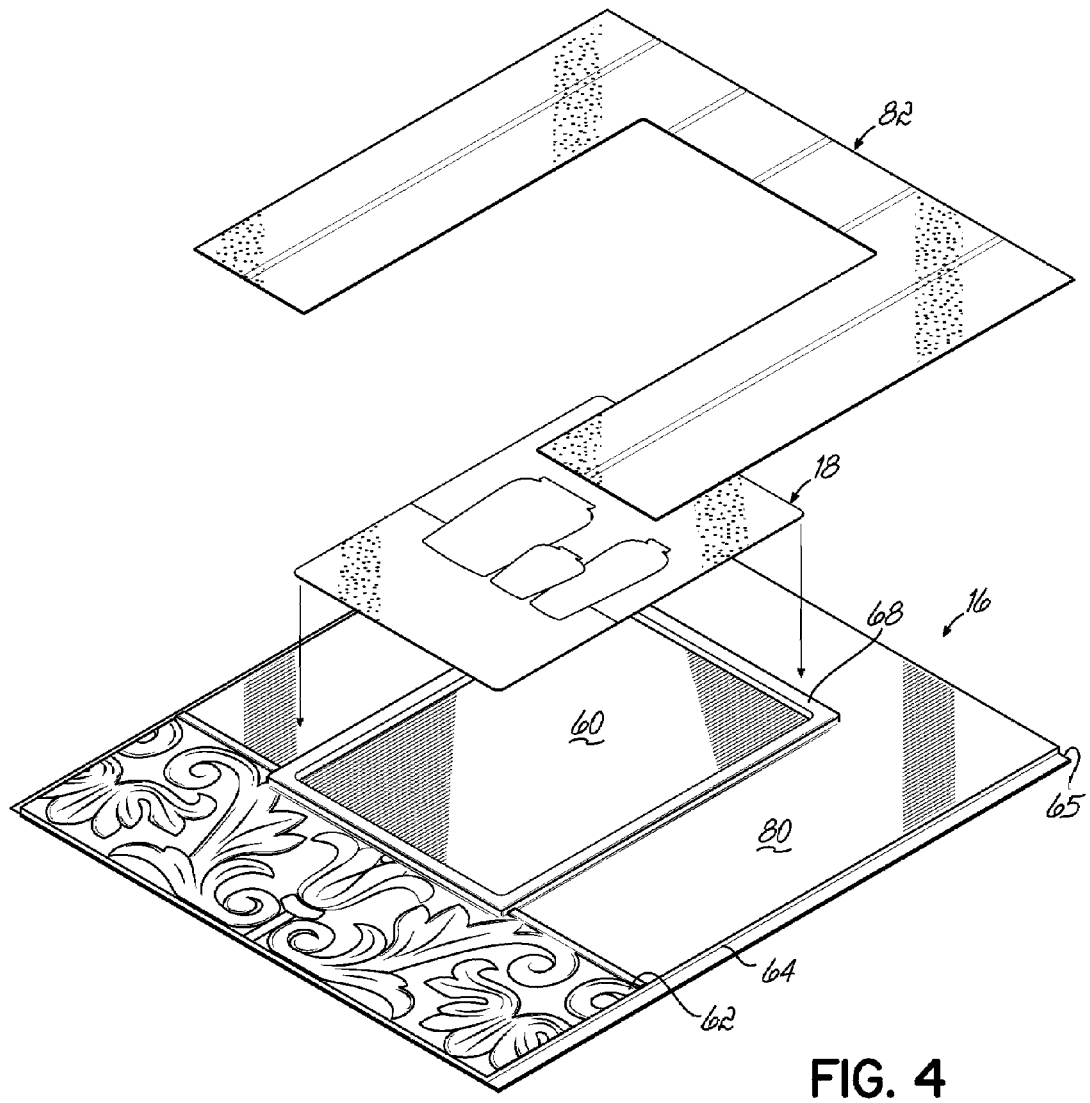
FIG. 4 is an exploded perspective view of an alternate embodiment of the present invention.

FIG. 4 shows an alternate embodiment of the present invention that demonstrates the versatility of the present invention. In this embodiment, the support member 16 includes a central planar support 60, as with the previous embodiment, and a second planar support 80, which is separated by the raised frame portion 68. This allows a first print 18 to be adhered to the planar portion 60, and a second print 82, which can be adhered to the planar portion 80. This provides the raised portion 68 to separate the two prints. The support member 16 in the embodiment shown in FIG. 4 can be treated in the same manner as previously described. This provides for a wide variety of different variations using the support member of the present invention.

Thus, the present invention accomplishes its stated goal of providing a wide variety of innovative art at a reduced price, which can be mass marketed, but is particularly aesthetically appealing.

This has been a description of the present invention along with the preferred method of practicing the present invention.

However, the invention itself should only be defined by the appended claims.

What is claimed is:

1. Three-dimensional artwork comprising
a peripheral raised circumferential frame having a back surface along a first plane;
a support member comprising a continuous one piece panel extended from near internal edges of said frame and a back surface parallel to said first plane;
said continuous one piece panel having an integral first planar portion and integral raised portions surrounding at least a portion of said first planar portion;
a first flexible print member fixed to said first planar portion of said support member, said print member comprising a two-dimensional artwork.

2. The artwork claimed in claim 1 wherein said support member is plastic.

3. The artwork claimed in claim 2 wherein said support member is coated with a plaster-like coating.

4. The artwork claimed in claim 2 wherein said support member is coated with a metallic paint.

5. The artwork claimed in claim 2 wherein said support member is vacuum formed.

6. The artwork claimed in claim 1 further comprising matting, said matting extending from said internal edges of said frame inwardly to said support member.

7. The artwork claimed in claim 1 wherein said support member includes a raised frame portion completely surrounding said planar portion.

8. The artwork claimed in claim 1 further comprising a second planar panel portion and a second flexible print member fixed to said second planar portion.

9. A three-dimensional artwork comprising
a support member comprising a continuous one piece panel having a back surface;
said continuous one piece panel having an integral first planar portion and integral raised portions surrounding at least a portion of said first planar portion;
a first flexible print member fixed to said first planar portion of said support member said print member comprising a two-dimensional artwork.

10. The three dimensional artwork claimed in claim 9 wherein said continuous one piece panel further includes a second integral planar portion
and wherein said integral raised portions separate said first planar portion from said second planar portion.

* * * * *